(12) United States Patent
Versolato et al.

(10) Patent No.: US 9,427,897 B2
(45) Date of Patent: Aug. 30, 2016

(54) PROCESS OF RECYCLING A FIBER-REINFORCED POLYMERIC MATERIAL AND RELATED APPARATUS

(71) Applicants: Daniele Versolato, Cordovado (IT); Emanuele Bravo, Cordovado (IT); Giovanni Lucchese, Caneva (IT); Franco Mioni, Rome (IT)

(72) Inventors: Daniele Versolato, Cordovado (IT); Emanuele Bravo, Cordovado (IT); Giovanni Lucchese, Caneva (IT); Franco Mioni, Rome (IT)

(73) Assignee: GEES RECYCLING S.r.l., Budoia (PN) (IT)

( * ) Notice: Subject to any disclaimer, the term of this patent is extended or adjusted under 35 U.S.C. 154(b) by 123 days.

(21) Appl. No.: 14/398,268

(22) PCT Filed: May 2, 2013

(86) PCT No.: PCT/IB2013/053483
§ 371 (c)(1),
(2) Date: Oct. 31, 2014

(87) PCT Pub. No.: WO2013/164784
PCT Pub. Date: Nov. 7, 2013

(65) Prior Publication Data
US 2015/0130106 A1    May 14, 2015

(30) Foreign Application Priority Data
May 3, 2012 (IT) .............................. PN2012A0024

(51) Int. Cl.
*B29B 17/00* (2006.01)
*B29C 43/02* (2006.01)
*B29B 17/04* (2006.01)
*B29K 105/06* (2006.01)

(52) U.S. Cl.
CPC ........... *B29C 43/02* (2013.01); *B29B 17/0042* (2013.01); *B29B 2017/042* (2013.01); *B29B 2017/0468* (2013.01); *B29K 2105/06* (2013.01); *Y02W 30/62* (2015.05)

(58) Field of Classification Search
None
See application file for complete search history.

(56) References Cited

U.S. PATENT DOCUMENTS

| | | | |
|---|---|---|---|
| 3,325,834 A | 6/1967 | Lovette et al. | |
| 2008/0217811 A1 | 9/2008 | Wolf | |
| 2008/0315020 A1* | 12/2008 | Van Der Wal | ........ B02C 18/148 241/29 |
| 2011/0212317 A1 | 9/2011 | Katz | |
| 2011/0301287 A1* | 12/2011 | Weyant | ............... B29B 17/0042 524/599 |

FOREIGN PATENT DOCUMENTS

| | | |
|---|---|---|
| JP | A-5-309753 | 11/1993 |
| JP | A-2004-148796 | 5/2004 |

OTHER PUBLICATIONS

Fukuda et al., "Examples of FRP Recycling in Japan," *Composites*, Nov.-Dec. 2006, pp. 28-31, vol. 33, No. 6.
International Search Report issued in International Patent Application No. PCT/IB2013/053483 mailed on Sep. 5, 2013.
Written Opinion of the International Searching Authority issued in International Patent Application No. PCT/IB2013/053483 mailed on Sep. 5, 2013.

\* cited by examiner

*Primary Examiner* — Mary F Theisen
(74) *Attorney, Agent, or Firm* — Oliff PLC

(57) ABSTRACT

The present invention is related to a process of recycling fiber-reinforced polymeric material including the following steps: a) crushing the material so as to reduce it into fragments; b) mixing the material obtained in the previous step with a liquid adhesive; c) pouring the mixture obtained in step b) into a mold; d) applying a pressure. In particular, the mixing step b) is carried out by nebulizing some adhesive and simultaneously stirring the particles of the fiber-reinforced polymeric material so that a thin layer of adhesive will deposit on the surface of basically each particle of the fiber-reinforced polymeric material. Furthermore, the present invention relates to an apparatus for carrying out the process.

8 Claims, 1 Drawing Sheet

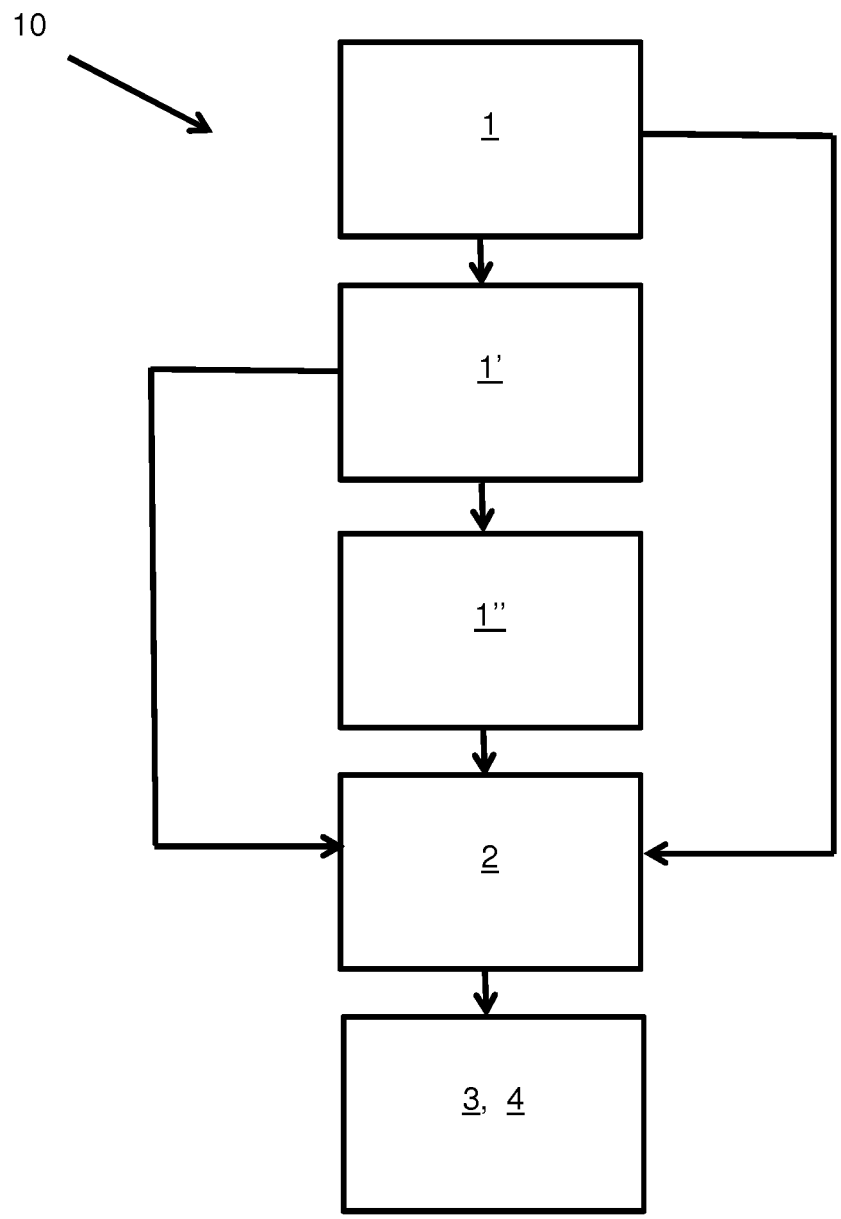

PROCESS OF RECYCLING A FIBER-REINFORCED POLYMERIC MATERIAL AND RELATED APPARATUS

TECHNICAL FIELD OF THE INVENTION

The present invention is related to a process, and relative apparatus, of recycling a fiber-reinforced plastic material.

PRIOR ART TECHNIQUE

The expression "fiber-reinforced plastic material", usually denoted by the acronym FRP (Fiber-Reinforced Polymers), means a composite material formed of a polymeric matrix to which it is added a reinforcing material in fiber form.

Generally, the polymeric material consists of a thermosetting resin, while the fiber material can be of various types to give the composite material resistance characteristics for different fields of application. For example, are usually employed carbon fibers to produce a material known as CFRP (Carbon Fiber Reinforced Polymer), glass fibers, whose resulting material is commonly named "fiberglass" or GFRP (Glass Fiber Reinforced Polymer) or also aramidic fibers, such as Kevlar, to make the material known as AFRP (Aramidic Fiber Reinforced Polymer).

The above described fibers are capable to give the composite material a high tensile strength, while the polymeric matrix is required only to distribute the stresses between the fibers, thus producing a stress uniformity between them.

Fiber-reinforced plastic materials are particularly appreciated thanks to their chemical-physical and mechanical characteristics: in fact, they ensure a very good corrosion strength, good thermal insulation, high mechanical strength and exceptional lightness. Further, they are rather inexpensive to make and easy to mold.

For these reasons, in the last fifty years they have been extensively used in the most diversified technical sectors, in particular in the construction of products exposed to atmospheric agents, such as watercrafts, swimming pools, tanks, windmill blades, sport equipment, piping, bathtubs, silos and containers of different kinds.

Because of this continuous and massive usage, now it is necessary to face the problem of the disposal of a high number of products, by now no longer used or damaged, made of such material. An evident example are the watercrafts whose hull and interiors are almost entirely made of fiberglass and whose dimensions make the problem of disposal very tangible and compelling.

Unfortunately, it is not easy to recycle this material as it is difficult, if not impossible, to separate the fibrous elements from the polymeric matrix, which is not recyclable/remoldable, especially those of the thermosetting type.

To overcome this problem, a proposed solution is described in the patent application US2008/0217811 of Astoria Industries of Iowa INC. In fact, such document shows a process for recycling the production scraps of fiber-reinforced plastic material, in particular fiberglass, which consists in preparing a mixture comprising fragments of such material, polyester resin, titanium dioxide as coloring pigment, thermoplastic microspheres and benzoyl peroxide as a catalyst. According to a preferable embodiment, the mixture is made of 35-40% by weight of ground fiberglass waste, 60-65% by weight of polyester resin, and 1% by weight of thermoplastic microspheres; the amounts of pigment and of catalyst are added as needed.

The mixture thus made is poured into a mold of the desired shape, and pressed with an air press having heated plates so that the mixture reaches the temperature to which the polymerization reaction will occur in the presence of the selected catalyst. Once the polymerization reaction of the mixture ends, the obtained product can be extracted from the mold.

However, the percentage of the recovery material used in such process is relatively restricted compared to the relevant amount of virgin material that is polyester resin and thermoplastic microspheres. This is mainly due to the fact that, fragmenting the starting material, the fibers are cut and therefore the recovery material resistance is reduced; therefore, in order to give the latter the mechanical properties suitable for the subsequent employment it is necessary to introduce materials which can increase its mechanical resistance.

Further, just because of the high quantity of polyester resin, the pressing step is to be carried out with a particular care and without reaching high pressures since the resin, if it is not equally mixed with the fragmented material, could filter up to the surface through the mixture porosities.

Document JP2004148796 (whereon the preamble of claim 1 of the invention is based), describes a process of recycling a fiber-reinforced polymeric material in order to obtain a panel, comprising the steps of:

a) crushing the material to be recycled so as to obtain "chips";

b) selecting the chips having determined dimensions, in particular those having width and thickness between 0.5 mm and 10 mm and a length between 10 mm and 200 mm;

c) mixing the chips selected in the preceding step with an adhesive, in particular an MDI resin (Methylene diphenyl isocyanate), possibly nebulizing it in a drum blender:

d) pouring the mixture obtained in the preceding step into a flat mold, arranging the chips so as all of them would be aligned, having the same orientation; and finally e) applying a pressure.

The length of the chips is a fundamental parameter for the above described process, as the bending strength of the final products, that is panels or beams, is given by the long fibers left after the crushing step. For the same reason, the chips then have to be laid in the mold all having the length oriented in the same direction.

A big limit to the above described process is in the fact that, crushing the material in order to obtain the chips, it is produced a rather relevant fraction of pulverized scrap material or in any case having dimensions smaller than the desired ones. This material is then discarded in the selection step and has to be eliminated. Therefore, the starting material cannot be completely recycled.

Moreover, the purpose of the above described process is exclusively that of obtaining structural elements provided with a determined bending strength, given to them exclusively by the glass fibers kept intact after obtaining the chips.

It is also known a process of recycling fiber-reinforced polymeric material comprising, besides a grinding step by means of a granulator, a subsequent pulverization step of the starting material so as to obtain particles having dimensions smaller than 50 μm, which is then mixed with an adhesive and, in case, with other components (calcium carbonate, fiber glass . . . ) and pressed in order to obtain a panel, as disclosed in Fukada et al. article having the title "Examples of FRP recycling in Japan".

However, in said article, the mixture composition preferably comprises a percentage by weight of pulverized recycled material between 10 and 50%, and preferably between 10 and 20% since for higher percentages the mixture viscosity is too high and unsuitable for the subsequent working steps. Therefore, also in this case the percentage of the recovery material used is relatively low compared to the relevant amount of virgin material.

Moreover, the pulverizing device described in the article is a hammer mill, absolutely advised against for the use with reinforced polymeric material as it causes the overheating of the material up to spontaneous ignition which, given the nature of the material, produces toxic and polluting fumes.

Finally, also the document US2011/0212317 describes a process of recycling plastic material wherein said material is crushed, mixed with an adhesive and pressed so as to obtain a panel. However, as the process concerns the recycling of car interiors, the starting polymeric material has a rather non-homogeneous composition and does not comprise fiber-reinforced material FRP. Moreover, the dimension of the granules originating from the crushing step is of 1", that is equal to about 2.5 cm; the dimension of these granules is too high in order to obtain a final product having a smooth and homogeneous surface and therefore said process is not suitable for making furnishings.

SUMMARY OF THE INVENTION

On the contrary, it would be desirable, and in fact, it is the main object of the present invention, to provide a process of recycling fiber-reinforced plastic material which reduces to a minimum, if not almost eliminates, the necessity of adding virgin material, being understood that the final product obtained with such process should have the mechanical characteristic suitable for the subsequent uses.

A further object of the present invention consists in providing a simple and feasible process with competitive production costs, so that the subsequent use of the recycled material is advantageous also under the economical point of view.

A further object of the present invention is that of providing a process which makes it possible to recycle the fiber-reinforced material several times, having to add only a limited amount of virgin materials in the subsequent recycling processes.

The above said task and objects, and others which will be described later, are achieved by carrying out a process as defined in claim 1 and by means of an apparatus as defined in claim 7 thereof.

BRIEF DESCRIPTION OF DRAWINGS

Further characteristics and advantages achievable through a process of recycling fiber-reinforced polymeric material according to the present invention will become more apparent in the following detailed, but not excluding, forms of embodiment, described for exemplification only but not limited to, with reference to the appended FIG. 1 schematically showing various devices which can be used to carry out a process of recycling fiber-reinforced polymeric material according to the present invention.

DETAILED DESCRIPTION OF THE INVENTION

With reference to FIG. 1, it is schematically shown an apparatus/system 10 through which it is possible to carry out a process of recycling fiber-reinforced material according to the present invention.

The fiber-reinforced polymeric material to be used in said process preferably comes from plants for the selection and treatment of waste or from production scraps of industries producing fiberglass and/or operating in different sectors, such as in the nautical sector or in the production of whirlpool bathtubs and swimming pools.

First of all said material, which is in different forms and dimensions, has to be reduced in particles having different dimensions according to the physical and mechanical characteristics of the finished product to be obtained. For this purpose, the process therefore provides at least a first step a) of coarse crushing, wherein the fiber-reinforced material is reduced into fragments or scales having dimensions of about 15 mm.

This first step a) can be carried out, for example, by means of a first crushing mill 1 of the known type and available on the market, having a low number of revolutions and preferably tungsten treated steel blades so as to have a good wear-proofing.

Optionally, following said first crushing step a), it can be provided a grinding step a'), wherein the material dimensions are further reduced in order to produce a ground having granules of dimensions between 2 and 8 mm. Said step a') is preferably carried out by means of a second mill 1', placed downstream of the first mill 1, this one too of the known type and with a low number of revolutions.

In order to avoid overheating which could cause the triggering of dangerous combustion reactions and in order to keep a high power in the crushing and grinding steps, said first and second mills 1,1' can advantageously be oversized in relation with the amount of material loaded. Moreover, advantageously, they can also be provided with a water cooling system.

Moreover, the process can provide a further pulverization step a"), wherein the ground coming from said second mill 1' is loaded in a pulverizing device 1" in order to obtain particles having dimensions smaller than about 1 millimeter. In particular, said pulverizing device 1" can be of the known type for the production of chipboard in the wood sector.

Once the fiber-reinforced polymeric material to be recycled has been reduced into particles (fragmented, ground or pulverized), later called "particulate material", it undergoes a step b) wherein it is mixed with a liquid adhesive so as to obtain a homogeneous mixture.

Said particulate material can have homogeneous dimensions, as it is collected at the exit of only one device chosen between the first mill 1 and the second mill 1' or the pulverizing device 1", alternatively, it is possible to form a heterogeneous mixture collecting variable amounts of particulate material at the exit of two or more of the above said devices.

Moreover, said liquid adhesive is essentially made of a synthetic resin, to which, in case, is added a suitable catalyst for the polymerization reaction, the amount of which will depend on the type of resin as those skilled in the field know very well. Preferably, said adhesive comprises polyester resin and a catalyst selected from benzoyl peroxide, methylethyl ketone and acetylacetone; obviously, other types of resins can be used, such as acrylic, epoxy or polyurethane resins.

According to a specific feature of the invention, said step b) is carried out by nebulizing the liquid adhesive, and simultaneously by stirring said particulate fiber-reinforced polymeric material. Advantageously, such expedient makes it possible to obtain a perfectly blended mixture against the amount of adhesive which is much lower than what recommended in the known art: in fact, the mixtures obtained during step b) comprise a percentage by weight of fiber-reinforced polymeric material between 78-98%, the remaining percentage 22-2% by weight comprising said liquid adhesive.

This is essentially due to the synergic action between the adhesive nebulization and the particulate material stirring: in fact it has been observed that, thanks to the simultaneousness of the two operations, basically all the particles of the particulate material come into contact with the liquid adhesive which is deposited on the surface of each particle forming a thin layer. Thus, the amount of adhesive used is the needed and sufficient one in order to obtain a well blended and homogeneous mixture. Obviously, this is particularly advantageous since it makes it possible to recycle a higher amount of fiber-reinforced polymeric material against a very limited use of virgin material.

In order to carry out said step b), the above said amounts of composites, measured manually or automatically, are loaded by means of a charging hopper of the gravimetric type inside a nebulizing device 2 comprising a vessel provided with means for stirring the particulate material and a plurality of tangential nozzles fed with a high pressure pump for nebulizing the adhesive. Preferably, step b) lasts between 5 and 15 minutes, and varies according to the amount of the loaded material.

Because of the material treated, also the temperature inside the nebulizing device 2 is suitably controlled and adjusted by means of a cooling system in order to avoid overheating; moreover, it can be provided a system for dust suction.

The mixture obtained in step b) is then poured into a suitable mold 3 (step c) of suitable shape and dimensions, and subjected to compression (step d). Said steps c) and d) are carried out by using an open mold 3 having the desired shape, preferably of steel, aluminium or high density polyurethane, and a press 4. In particular, the mold is thermoregulated by means of a water or oil system or, alternatively, the press plate is electrically heated. Through the use of said systems the mixture temperature reaches maximum 100° C.: in fact, the selected catalysts make it possible the start and the development of the polymerization reaction for temperatures between 0° C. and 80° C.

The applicable pressure with press 4 can change according to the degree of structurality/stiffness it is desired to confer to the finished product; however, it can reach rather high values, without making the resin filter up to the surface, as, on the contrary, it is observed in the known art: also this advantage is linked to the fact that during step b) the adhesive is nebulized and simultaneously the particulate material is kept stirring, enabling a stable union between the two main components of the mixture. Therefore, pressures up to 170 kg/cm$^2$ can be applied and the pressure cycle can last between 60-500 seconds. Finally, the finished product is extracted from mold 3.

Optionally, also other recovery materials can be added to a mixture obtained as described above, in order to obtain different products according to the different uses of the final product. For example, a composite particularly suitable for making shower trays can be obtained adding 75% by weight of the mixture of fiber-reinforced particulate material and nebulized adhesive obtained as shown above and 25% by weight of non-fiber-reinforced polymeric particulate material, such as acrylonitrile-butadiene-styrene (ABS), polymethylmethacrylate (PMMA), polystyrene (PS) or polyurethane. Preferably, the percentage by weight of such non-reinforced polymeric recovery material does not exceed 35% by weight against the whole composite.

A further example of a composite particularly suitable for making kitchen worktops comprises 60% by weight of the mixture of fiber-reinforced particulate material and nebulized adhesive and 25% of non-reinforced polymeric recovery material, 10% of quartz or calcium carbonate and 5% of calcium hydroxide. In particular, the addition of the latter component, preferably by percentages up to 5%, is advisable when making products which will then be used in interior furnishings: in fact, almost all the materials used in the process come from plants for the selection and treatment of waste, or they are production scraps of industries which work polymeric material, these scraps are stored in containers exposed to atmospheric agents for long periods of time, and therefore subject to mildew formation and bacteria proliferation. Therefore, calcium hydroxide, thanks to its high basicity, acts as a sterilizing agent, and it is particularly suitable for making panels, worktops, tables, chairs and generally elements for interior furnishings.

In the table which appears below, are shown, for exemplification only but not limited to, further composites particularly suitable for making specific products; in order to obtain particular aesthetic effects, besides the materials described above, it is possible to add leather fragments, wood dust and rubber to the mixture.

Before pouring the mixture or the composite into the mold, in order to confer surface working and/or special aesthetic finishing to the final product, it is possible to arrange in its bottom, where the exposed surface of the product will be formed, different materials depending on the desired aesthetic finishing. For example, a gel-coat layer can be spread or sprayed on the mold in order to confer a varnished appearance to the product surface; wooden laminates, or quartz, slate or stone plates will instead be provided whenever it is desired to give the final product a natural appearance, which is particularly appreciated especially for kitchen worktops.

Finally, in order to increase the resistance of the final product, it is possible to provide the insertion of glass, kevlar or carbon long fibers: such operation will preferably be carried out during the molding step, and in particular soon after having poured the mixture or the composite into said mold. Alternatively, the structural stiffness of the final product can be increased by using a mold shaped in such a way so as to form a plurality of stiffening ribs on the product itself, in correspondence of which the material thickness will be higher and, consequently, also the bending strength.

Further, it is possible to arrange, inside the mold, structural elements, such as small metal frames, threaded bushings, etc., adapted to increase the resistance of the final product and/or to facilitate its subsequent assembly with other elements to make complex products; for example, in order to make a table, a plurality of threaded bushings can be arranged inside the mold to make the panel suitable to form the flat surface of a table, in particular where its supporting legs will be placed.

|  | Highest usable percentage | Interior panels | Shower trays, bathtubs | Kitchen worktops | Chairs |
|---|---|---|---|---|---|
| Particulate material mixture and adhesive [% by weight] | 100 | 60 | 75 | 60 | 60 |
| Non-reinforced recovery polymeric material [%] by weight | 35 | 10 | 25 | 25 | 25 |

-continued

| | Highest usable percentage | Interior panels | Shower trays, bathtubs | Kitchen worktops | Chairs |
|---|---|---|---|---|---|
| Leather fragments [% by weight] | 20 | | | | 5 |
| Quartz or calcium carbonate [% by weight] | 10 | 10 | | 10 | |
| Wood dust [% by weight] | 10 | 10 | | | 5 |
| Rubber [% by weight] | 20 | 5 | | | |
| Calcium hydroxide [% by weight] | 5 | 5 | | 5 | 5 |

In conclusion, a process of recycling fiber-reinforced polymeric material according to the present invention basically consists in the steps of:
- a) crushing the fiber-reinforced polymeric material;
- b) mixing said fiber-reinforced polymeric material with a liquid adhesive in order to form a mixture;
- c) pouring said mixture into a mold;
- d) applying pressure to said mixture In particular, said step b) is carried out by nebulizing the adhesive and simultaneously stirring the material reduced into particles, so that a thin layer of adhesive is deposited basically on the surface of each fragment of fiber-reinforced polymeric material.

Said process is preferably carried out by means of a system/apparatus 10 comprising the following devices arranged into a sequence:
- a first mill 1 for crushing said fiber-reinforced polymeric material,
- a nebulizing device 2 comprising a vessel provided with a loading hopper for the inlet of the fiber-reinforced polymeric material, stirring means for stirring said material and a plurality of tangential nozzles fed with a high pressure pump for nebulizing said liquid adhesive,
- an open mold 3 in which is poured the mixture obtained in the previous devices, and
- a press 4.

Obviously, further steps can be added, and consequently the system/apparatus can be modified, in order to obtain particular products or effects, nevertheless without exiting the field of the present invention.

In conclusion, from what described so far, it is apparent that objects and advantages initially expected are achieved by means of a process according to the present invention and of the related apparatus for its realization.

In fact, thanks to such process it is possible to obtain products made of fiber-reinforced polymeric recovery material having mechanical properties suitable for subsequent uses against a minimal addition of virgin material.

Advantageously, such products, besides being recycled, are also recyclable: in fact, it is possible to further reuse the same material, simply making it undergo a process according to the present invention.

Moreover, a process according to the present invention is simple and feasible with competitive production costs: consequently, the use of the recycled material produced is advantageous also from the economical point of view.

Of course, the present invention can have a great number of applications, modifications and variations nevertheless without departing from the protection field of the invention, as defined in the appended claims.

Moreover, the materials and the equipment used in the present invention, as well as the shapes and dimensions of the single components, will be the most suitable according to specific requirements.

The invention claimed is:

1. Process of recycling a fiber-reinforced polymeric material comprising the following steps
    a) crushing said material so as to reduce it into fragments;
    b) mixing the material obtained in the previous step with a liquid adhesive, said step b) being carried out by nebulizing said adhesive and simultaneously stirring the particles of the fiber-reinforced polymeric material so that a thin layer of adhesive is deposited on the surface substantially of each particle of fiber-reinforced polymeric material;
    c) pouring the mixture obtained in step b) into a mold;
    d) applying a pressure,
    following said first step a), it is provided a step a') of grinding at least a portion of the fragments obtained in said step a) so as to obtain granules of dimensions between 2 and 8 mm, and subsequent to said step a'), it is provided a step a") of pulverizing at least a portion of the granules obtained in step a') so as to obtain particles of dimensions smaller than 1 mm.

2. Process according to claim 1, wherein said mixture comprises an amount from about 78% to about 98% by weight of said fiber-reinforced polymeric material, the remaining amount by weight including said liquid adhesive.

3. Process according to claim 1, wherein said liquid adhesive comprises a polyester resin and a catalyst for polymerization reactions, said catalyst being selected from benzoyl peroxide, methylethyl ketone and acetylacetone.

4. Process according to claim 1, wherein an amount of other materials up to a maximum of 35% by weight can be added to the mixture formed in said step b) in order to confer special aesthetic effects to the final product.

5. Process according to claim 1, wherein, before said step c), the mold is covered at least partially by a material in order to confer special aesthetic effects on the surface of the final product.

6. Process according to claim 1, wherein structural elements are arranged inside the mold in order to facilitate the assembly of further elements to the finished product in order to make complex products.

7. Apparatus for carrying out a process according to claim 1, comprising:
    a first blade mill for crushing said fiber-reinforced polymeric material, said first mill being provided with a cooling system,
    a nebulizing device comprising a vessel provided with a loading hopper for the inlet of said fiber-reinforced polymeric material, stirring means for stirring said fiber-reinforced polymeric material and a plurality of tangential nozzles fed with a high pressure pump for nebulizing said liquid adhesive,
    an open mold in which is poured the mixture obtained in the previous device, and
    a press,
further comprising, downstream of said first mill and upstream of said nebulizing device, a second blade mill for grinding, provided with a cooling system, and a pulverization device for the fiber-reinforced polymeric material.

8. Apparatus for carrying out a process according to claim 7, wherein said first and second mills are oversized in order to avoid overheating of the material.

* * * * *